| (12) | United States Patent | (10) Patent No.: | US 10,766,545 B2 |
|---|---|---|---|
| | Thullier et al. | (45) Date of Patent: | Sep. 8, 2020 |

(54) AERODYNAMIC DEFLECTOR DEVICE FOR A MOTOR VEHICLE WHEEL

(71) Applicant: Valeo Systemes Thermiques, Le Mesnil Saint Denis (FR)

(72) Inventors: Christophe Thullier, Le Mesnil Saint-Denis (FR); Sylvain Gerber, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 200 days.

(21) Appl. No.: 16/060,122

(22) PCT Filed: Nov. 8, 2016

(86) PCT No.: PCT/FR2016/052895
§ 371 (c)(1),
(2) Date: Nov. 9, 2018

(87) PCT Pub. No.: WO2017/098100
PCT Pub. Date: Jun. 15, 2017

(65) Prior Publication Data
US 2019/0061842 A1    Feb. 28, 2019

(30) Foreign Application Priority Data
Dec. 10, 2015    (FR) ...................... 15 62112

(51) Int. Cl.
*B62D 35/02*        (2006.01)
*B62D 35/00*        (2006.01)
*B62D 37/02*        (2006.01)

(52) U.S. Cl.
CPC ........... *B62D 35/02* (2013.01); *B62D 35/005* (2013.01); *B62D 35/007* (2013.01); *B62D 37/02* (2013.01); *Y02T 10/82* (2013.01); *Y02T 10/88* (2013.01)

(58) Field of Classification Search
CPC .... B62D 35/02; B62D 35/005; B62D 35/007; B62D 27/02
(Continued)

(56) References Cited

U.S. PATENT DOCUMENTS

| 4,904,016 A | * | 2/1990 | Tatsumi | ............... B62D 35/005 296/180.5 |
| 6,886,883 B2 | * | 5/2005 | Jacquemard | ......... B62D 35/005 296/180.5 |

(Continued)

FOREIGN PATENT DOCUMENTS

| DE | 42 09 164 A1 | 9/1993 |
| JP | S60 099173 U | 7/1985 |
| JP | 2006-069396 A | 3/2006 |

OTHER PUBLICATIONS

International Search Report issued in PCT/FR2016/052895 dated Jan. 23, 2017 (2 pages).

(Continued)

*Primary Examiner* — Joseph D. Pape
(74) *Attorney, Agent, or Firm* — Osha Liang LLP

(57) ABSTRACT

An aerodynamic deflector device for a wheel of a motor vehicle, including: a support that is elongate and designed to be mounted on a motor vehicle; a deflecting wall mounted such that it is movable on the support between a retracted position in which the deflecting wall is raised in relation to the support in the mounted state, and a deployed position in which the deflecting wall is lowered in relation to the support in the mounted state; and an actuator designed to move the deflecting wall between the retracted and deployed positions. The deflecting wall is mounted such that it can be rotatably moved on the support about an axis of rotation oriented substantially parallel to a longitudinal axis of the support and driven by the actuator.

18 Claims, 4 Drawing Sheets

(58) Field of Classification Search
USPC .......................................... 296/180.1, 180.5
See application file for complete search history.

(56) References Cited

U.S. PATENT DOCUMENTS

| | | | |
|---|---|---|---|
| 7,845,709 B2 * | 12/2010 | Browne | B62D 25/182 |
| | | | 296/180.5 |
| 2008/0100071 A1 | 5/2008 | Browne et al. | |
| 2014/0175831 A1 * | 6/2014 | Hoelzel | B62D 35/005 |
| | | | 296/180.5 |

OTHER PUBLICATIONS

Written Opinion of the International Searching Authority issued in PCT/FR2016/052895 dated Jan. 23, 2017 (5 pages).

* cited by examiner

AERODYNAMIC DEFLECTOR DEVICE FOR A MOTOR VEHICLE WHEEL

CROSS-REFERENCE TO RELATED APPLICATIONS

This application is a National Stage application of International Patent Application No. PCT/FR2016/052895, filed on Nov. 8, 2016, which claims priority pursuant to 35 U.S.C. § 119(a) to French Patent Application No. 1562112, filed on Dec. 10, 2015 in France. The entire contents of these applications are incorporated herein by reference in their entirety.

The invention relates to a motor vehicle wheel aerodynamic deflector device.

BACKGROUND

A constant preoccupation in the automotive sector is that of fuel consumption and the ecological impact of the vehicle in particular due to its emissions of greenhouse-effect gases such as $CO_2$ or due to toxic gases such as NOx, for example. In order to reduce fuel consumption, automobile manufacturers have been attempting, on the one hand, to make the propulsion engines more efficient and, on the other hand, to reduce the consumption of the equipment of the vehicle.

An important factor in the consumption of a vehicle is determined by the wind loading or the aerodynamics of the vehicle.

Specifically, the aerodynamics of a motor vehicle is an important characteristic since it particularly influences the fuel consumption (and therefore pollution) and also the performance, in particular acceleration performance, of said vehicle.

In particular, drag or aerodynamic resistance to forward travel plays a decisive role, in particular at higher speeds, since drag varies as a function of the square of the speed of movement of the vehicle.

According to the models used in fluid mechanics, it is possible for example to quantify the drag force which is exerted on a motor vehicle with the aid of a reference area S. In a first approximation, the drag force, termed Fx, is equal to $q*S*Cx$, where q denotes the dynamic pressure ($q=\frac{1}{2}\rho*V^2$, $\rho$ denoting the density of the air and V the speed of the vehicle with respect to the air), Cx denoting a coefficient of drag specific to the vehicle.

The reference area used for a motor vehicle usually corresponds to its frontal area. It will therefore be understood that, in order to reduce drag, it is necessary to aim at reducing the reference area.

A more detailed analysis of the aerodynamic phenomena has also made it possible to bring to light the decisive role of the vehicle wheels.

Specifically, the wheels may considerably increase the aerodynamic resistance since they generate turbulence when the air flow strikes the rotating wheel. At high speeds, it has been demonstrated that the front wheels can contribute up to a value of 30% to the reference area.

Specifically, when a motor vehicle is moving, the air in which it travels is deflected according to the profile of the vehicle. The air thus deflected particularly reaches the wheel housing. The wheel housing is a cavity formed in the body of the vehicle and surrounding a wheel (this corresponds to the fender of the vehicle). The wheel housing performs a number of functions. It limits in particular (by retaining them) the projections of water, of mud or of other materials on which the wheel is likely to circulate and which it can be led to expel during its rotation. The air reaching the wheel housing circulates in particular in the narrow space separating the wheel from the wheel housing. It is known that, as this takes place, turbulence forms around the wheel revolutions and creates an aerodynamic brake.

It is known to place a fixed deflector in front of a motor vehicle wheel. Such a fixed deflector, which can take the form of a skirt (often of about 5 cm in height), makes it possible to reduce the turbulence in the wheel housing.

However, such a fixed deflector risks being damaged when crossing obstacles (sidewalk, speed-reducing device of the speed hump type, etc.).

SUMMARY OF DISCLOSURE

To solve this problem, a deflector device equipped with an actuator can be envisioned.

However, it is necessary to ensure that it is possible to optimize the design of the actuator both in terms of bulk and electrical consumption.

The present invention aims at at least partially overcoming some of the disadvantages described above by proposing an aerodynamic deflector device equipped with an actuator whose size and power can be limited.

Accordingly, the subject of the invention is an aerodynamic deflector device for a motor vehicle wheel, comprising:
- an elongate support configured to be mounted on a motor vehicle, the support has a longitudinal axis substantially parallel to the longitudinal axis of the vehicle,
- a deflecting wall mounted on a support so as to be movable between, on the one hand, a retracted position in which, in the mounted state, said deflecting wall is raised with respect to the support, and, on the other hand, a deployed position in which, in the mounted state, said deflecting wall is lowered with respect to the support, and
- an actuator configured to move said deflecting wall between the retracted and deployed positions, characterized in that the deflecting wall is mounted rotatably on the support about an axis of rotation oriented substantially parallel to the longitudinal axis of the support and driven by the actuator.

In other words, by virtue of a pivoting about an axis of rotation oriented substantially parallel to the longitudinal axis of the support, or substantially parallel to the direction of the flow of the air, the lowering or the deployment of the deflecting wall is less disturbed by the flow of the air. This makes it possible to optimize the design of the actuator both in terms of bulk and electrical consumption.

The aerodynamic deflector device according to the invention can comprise one or more of the following features, taken alone or in combination:

The deflecting wall has, for example, in longitudinal section, a ramp shape, in particular a curved ramp shape.

It is, for example, envisioned that the radius of curvature of the curved ramp decreases progressively from the distal end intended to be arranged remote from the wheel toward the proximal end intended to be arranged in the vicinity of the wheel.

According to another aspect, the deflecting wall has, at the proximal end intended to be arranged in the vicinity of the wheel, in cross section, a "U" shape, the bottom of the "U" being remote from the axis of rotation.

The device comprises a closure wall situated at the proximal end of the deflecting wall.

According to yet another aspect, the support is produced as a frame of rectangular shape and configured to be fixed to the chassis of a motor vehicle.

The actuator comprises in particular a rotary output member in direct or indirect engagement with said axis of rotation.

The axis of rotation bearing the deflecting wall is, for example, configured to carry out a rotation of 180° between the retracted and deployed positions.

The invention also relates to a motor vehicle, characterized in that it comprises at least one aerodynamic deflector device as defined above and arranged upstream of a motor vehicle wheel.

BRIEF DESCRIPTION OF THE DRAWINGS

Other advantages and features will become apparent on reading the description of the invention and from the appended drawings, in which.

In the description, identical elements are identified by the same reference numbers.

DETAILED DESCRIPTION

In the present description, "upstream" is intended to mean that an element is placed before another with respect to the direction of circulation of the air flow. By contrast, "downstream" is intended to mean that an element is placed after another with respect to the direction of circulation of the air flow. The terms "upper", "lower", "top" and "bottom" refer to the arrangement of the elements in the figures, which generally corresponds to the arrangement of the elements in the mounted state in a motor vehicle.

The following embodiments are examples. Although the description refers to one or more embodiments, this does not necessarily mean that each reference relates to the same embodiment, or that the features apply only to just one embodiment. Single features of various embodiments can also be combined or interchanged in order to create other embodiments.

A reference marker LH or LTH in a figure respectively indicates the longitudinal (L), transverse (T) and height (H) directions corresponding to x-y-z directions of the vehicle.

In the description, certain elements or parameters can be indexed, such as, for example, first element or second element and also first parameter and second parameter or else first criterion or second criterion, etc. In this case, what is concerned is a simple indexing to differentiate and denominate elements or parameters or criteria which are similar but not identical. This indexing does not imply a priority of one element, parameter or criteron with respect to another and such denominations may easily be interchanged without departing from the scope of the present description. This indexing also does not imply an order in time.

Figure 1A:
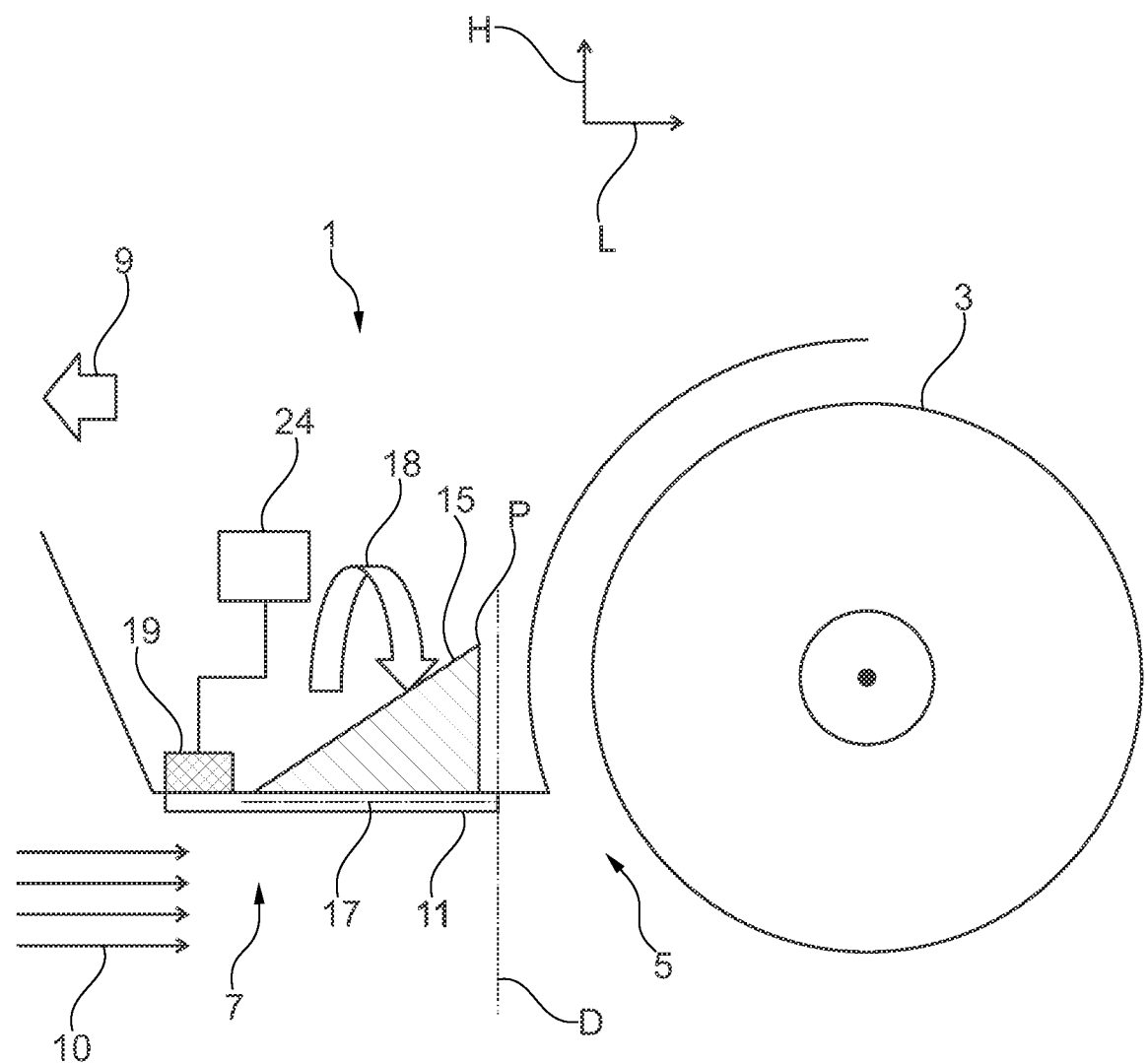
FIGS. 1A and 1B show side diagrams of the aerodynamic deflector device according to a first embodiment in two different positions.

FIG. 1A shows a simplified side diagram of a front part 1 of a motor vehicle, in particular a wheel 3 and a wheel housing 5 provided with an aerodynamic deflector device 7 for the wheel.

In the diagram of FIG. 1A, the vehicle moves in the direction of the arrow 9, with the result that an air flow 10 impacts the vehicle and in particular the wheel 3 in the opposite direction.

The aerodynamic deflector device 7 comprises an elongate support 11 configured to be mounted on a motor vehicle with its longitudinal axis substantially parallel to the longitudinal axis "L" of the vehicle, configured to be, for example, on the chassis upstream of the wheel 3 in a receptacle provided for this purpose, for example at the level of a wheel housing 5.

Figure 2A:
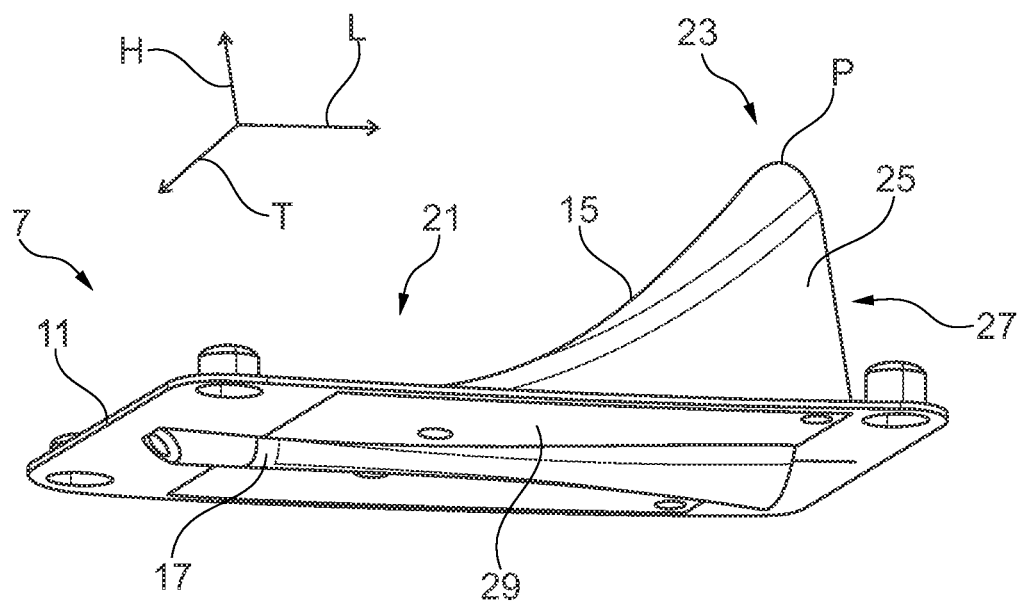
FIGS. 2A to 2C show side diagrams of the aerodynamic deflector device according to a second embodiment in three different positions.
Figure 2B:
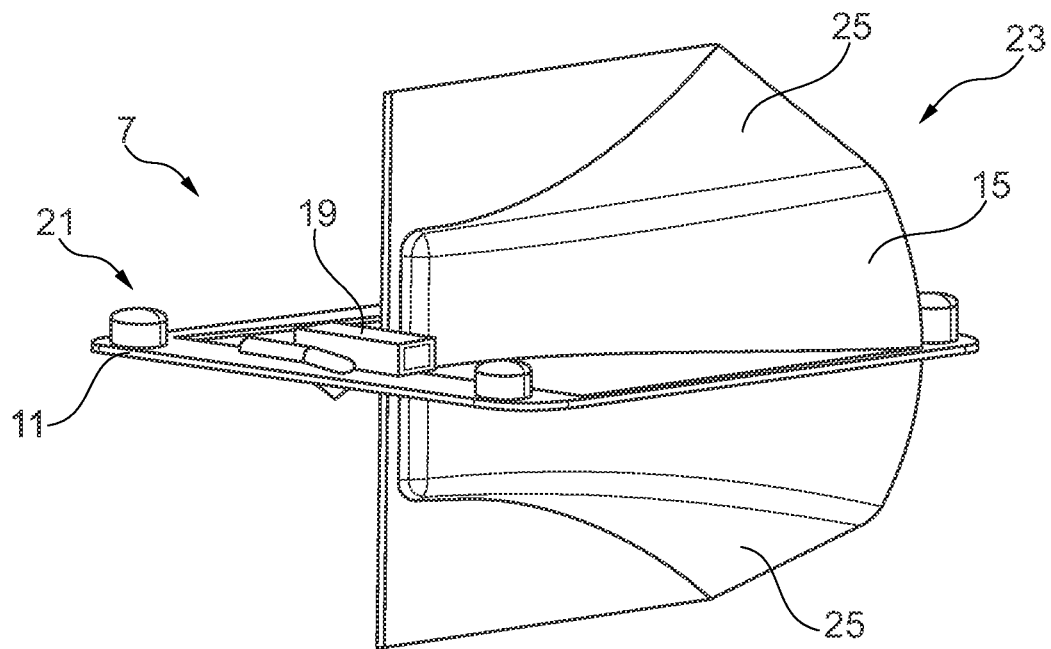
Figure 2C:
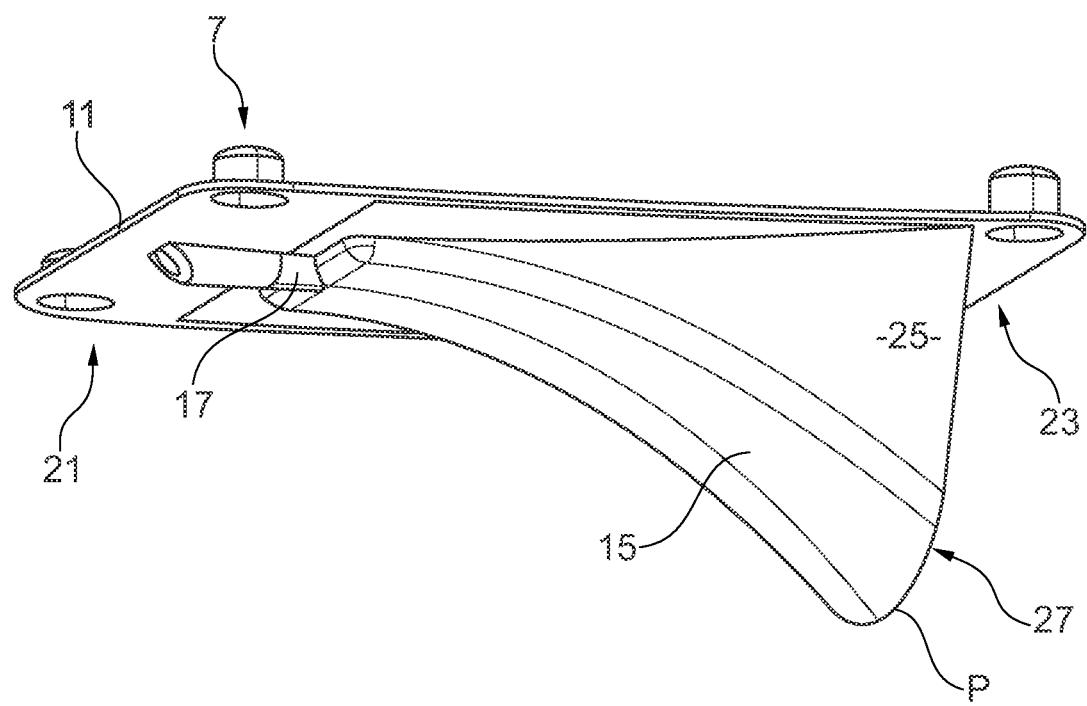

As will be better visible from FIGS. 2A to 2C, in the present embodiment the support 11 is produced for example as a frame configured to be fixed to the vehicle, for example by screwing or by clamps or any other fixing means.

The aerodynamic deflector device 7 further comprises a deflecting wall 15.

Figure 1B:
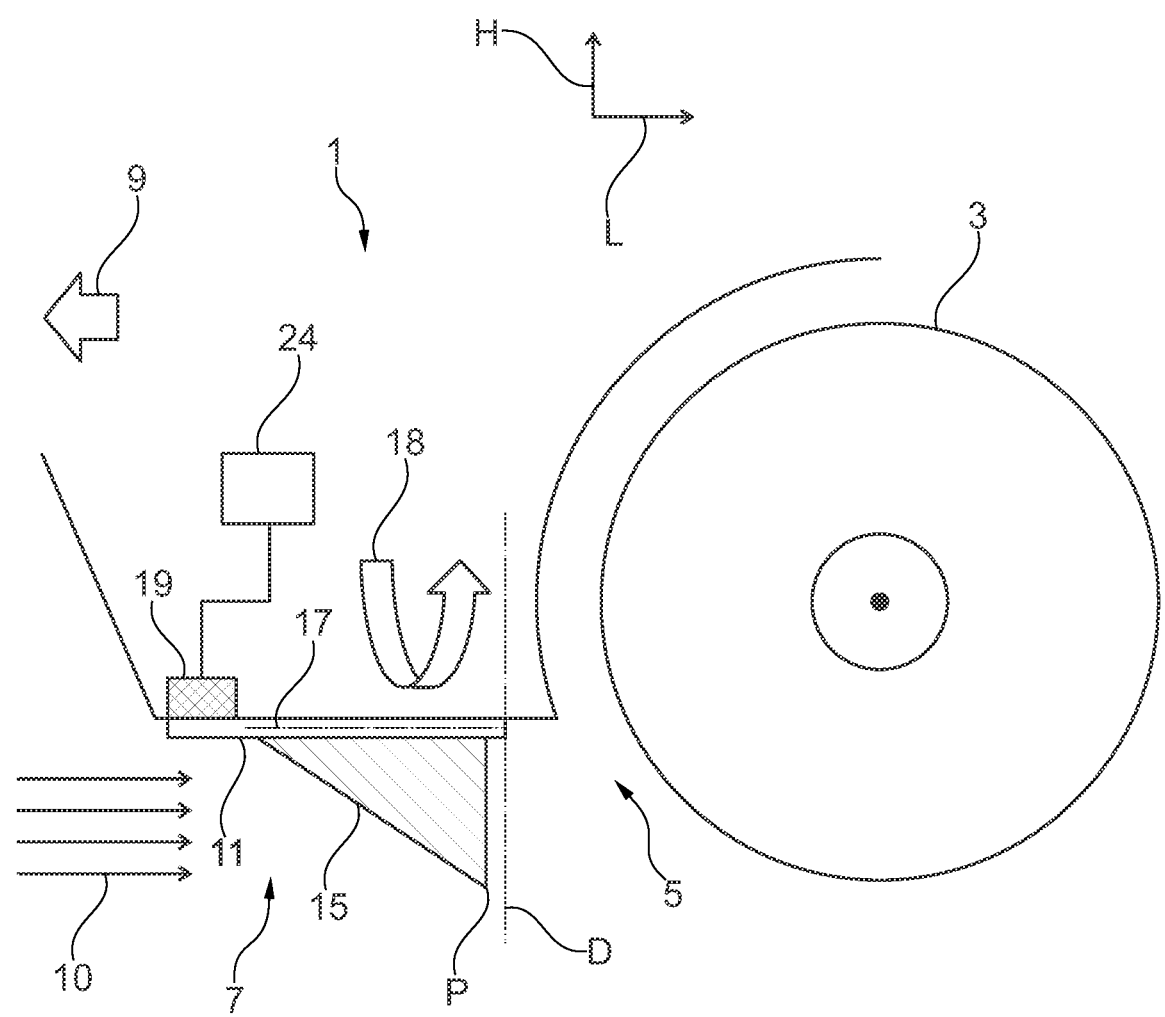

As can be seen in FIGS. 1A, 1B, this deflecting wall 15 has a ramp shape when seen in longitudinal section, that is to say in the direction of the length of the deflecting wall 15. In the present embodiment, this ramp formed by the deflecting wall 15 is a plane.

This deflecting wall 15 is rotatable between, on the one hand, a retracted position (see FIG. 1A) and, on the other hand, a lowered or deployed position (see FIG. 1B).

In the retracted position, the deflecting wall 15 is raised into a receptacle situated upstream of the wheel housing 5 and therefore does not form any obstacle to the air flow 10 impacting the wheel 3.

This retracted position is generally adopted for speeds which are not very high, for example below 50 km/h.

Specifically, for low speeds, the effect of the deflecting wall 15 is of little importance, in particular with respect to the reference area.

Moreover, it is at these speeds below about 50 km/h that obstacles are crossed, such as, for example, sidewalks, speed-reducing devices of the speed hump type, speed cushion type, etc. By assuming the retracted position at these low speeds, the deflecting wall 15 is protected against breakage.

In the lowered or deployed position shown in FIG. 1B, the deflecting wall 15 is placed upstream of the wheel 3 of the vehicle while being at least partially below the axis of rotation 17 of said wheel 3.

It is in this lowered or active position that the air flow 11 is deflected so as not to be able to sweep into the wheel housing 5. There is thus avoided the creation in the wheel housing 5 of turbulence which contributes to the significant increase of the reference area.

Thus, the drag force can be contained to more acceptable values.

In order to be able to effect the movement between the retracted position (FIG. 1A) and the deployed position (FIG. 1B), the deflecting wall 15 is mounted rotatably on the support 11 about an axis of rotation 17 oriented substantially parallel to the longitudinal axis of the support 11. In the present case, the axis of rotation 17 is a physical axis indicated in the figures by a dotted line. It may, for example, be a tube on which the deflecting wall is fixed and whose ends are held by rotary bearings.

In other words, this axis of rotation 17 is oriented substantially perpendicularly with respect to a theoretical line D defined by the raised and lowered position of the deflecting wall. This line D is obtained for example by connecting the tip P of the deflecting wall 15 in the retracted and deployed positions. It will therefore be understood that the axis of rotation 17 is, in the mounted state on the vehicle, substantially parallel to the longitudinal axis L of the vehicle. In other words, the axis of rotation 17 can also be defined as being the axis of rotation extending over the length of the support 11, the support 11 being inscribed in an elongate plane.

As indicated by the arrow 18, the deflecting wall 15 can therefore turn about this axis of rotation 17.

Owing to the orientation of the axis of rotation 17, which is therefore situated substantially parallel to the air flow 10 when the vehicle is travelling, the forces necessary to move the deflecting wall 15 between the two aforementioned positions are rather small. Specifically, the force exerted by the air flow 10 on the deflecting wall 15 is taken up via the axis of rotation 17 by the support 11, and for the movement of the deflecting wall 15, it is not necessary to exert a direct force counter to the air flow 10.

According to an example, the axis of rotation 17 and the deflecting wall 15 are two separate parts fixed to one another. It can, for example, be envisioned that the axis of rotation 17 is made of metal and the deflecting wall is also made of metal or of plastic.

To move the deflecting wall 15 between the retracted and deployed positions, the aerodynamic deflector device 7 additionally comprises an actuator 19 which can therefore be designed to have a quite small power, bulk and consumption.

The actuator 19 is, for example, an electric motor with a rotary output member in direct or indirect engagement with the axis of rotation 17.

FIGS. 2A, 2B and 2C show side diagrams of the aerodynamic deflector device 7 according to a second embodiment in three different positions.

It can best be seen from these figures that the support 11 is produced as a frame of rectangular shape and configured to be fixed to the chassis of a motor vehicle.

This second embodiment differs from that of FIGS. 1A and 1B in that the deflecting wall 15 has, in longitudinal section, a curved ramp shape. The ramp forming the deflecting wall 15 has, in particular, a radius of curvature which decreases progressively from the distal end 21 intended to be arranged remote from the wheel 3 toward the proximal end 23 intended to be arranged in the vicinity of the wheel 3.

The deflecting wall 15 is additionally rounded and flanked by two straight lateral wall portions 25. Thus, the deflecting wall 15 has, at the proximal end 23, in cross section, a "U" shape, the bottom of the "U" being remote from the axis of rotation 17.

In order, for example, to avoid mud being able to accumulate within the volume defined by the deflecting wall 15 and the, for example straight, lateral walls 25, there is additionally provided a closure wall 27 at the proximal end 23 and a closure wall 29 connecting the lateral walls 25. In the retracted and deployed positions, the closure wall 29 is therefore in the same plane as the support 11 in the form of a frame.

These various walls 15, 25, 27 and 29 thus define a completely closed volume which can rotate about itself through 360°. This is another advantage since, for the actuator 19, it is possible to choose, for example, an electric motor which rotates in a single direction. Such motors are in fact less expensive than those which rotate in two opposite directions and require control electronics.

In addition, according to one variant, provision can be made for the various walls 15, 25, 27 and 29 and for the axis of rotation 17 to be produced in one piece by molding and/or injection-molding, particularly from plastic, in particular reinforced by fibers, such as glass or carbon fibers, for example.

The axis of rotation 17 bearing the deflecting wall 15 is configured to allow a rotation of 180° between the retracted and deployed positions.

Returning to FIGS. 1A and 1B, the actuator 19 is, for example, connected to a control unit 24 comprising, for example, an electronic circuit such as a microprocessor or a microcontroller receiving speed information from a speed sensor and ordering the deployment or the retraction of the deflecting wall 15 as a result.

According to one possible embodiment, a hysteresis mechanism is provided in order to avoid threshold effects. Thus, it is possible to make provision for the control unit 24 to trigger the deployment of the deflecting wall 15 as soon as the speed exceeds a given threshold (for example 50 km/h), but for the retraction of the deflector to be triggered only when the speed drops again below a threshold below the aforementioned threshold (for example a threshold of 40 km/h).

Thus, the circuit avoids triggering alternations of deployment and retraction in an untimely manner when the vehicle is travelling at a speed close to the initial threshold and passes permanently from either side of this threshold.

The threshold for triggering the deployment (for example 50 km/h) is chosen so as to be sufficiently high for the deployment to have a perceptible effect on aerodynamic drag. Drag varies with the square of the speed. For low speeds, drag is itself very low. Deploying the deflector is then not useful.

The threshold for triggering the retraction (for example 40 km/h) is chosen so as to be sufficiently high for the driver to be able to reasonably envision the crossing of obstacles (sidewalks, speed humps, etc.) at the speed in question. Thus, a situation is avoided in which the motor vehicle is caused to cross such an obstacle (of the kind to damage the deflector) while the deflector is deployed.

According to yet another variant, the control unit 24 also receives geolocation data associated with information on the driving situation.

Thus, for example, the control unit 24 can be configured to inhibit any deployment of the deflecting wall 15 in built-up areas where the speed is limited. Specifically, it is in built-up areas that there is most risk of having to cross obstacles which can damage the deflecting wall 15.

Of course, such a control unit 24 is also provided for the embodiment of FIGS. 2A to 2C, even though this unit is not represented in the figures for the sake of simplification.

According to another variant (not shown), provision can also be made for the deflecting wall 15 to have only the shape of a half-disk which can be placed in front of the wheel 3 in the deployed position by rotating about the axis of rotation 17. According to yet another variant, the deflecting wall 15 can be formed only by a wall having the same shape as the closure wall 27 of FIGS. 2A to 2C.

It will therefore be understood that the aerodynamic deflector device 7 according to the invention makes it possible to improve aerodynamic drag of the vehicle and therefore in particular the fuel consumption of the vehicle while, by virtue of its controlled or active character, allowing the crossing of obstacles at low speed with full security.

What is claimed is:

1. An aerodynamic deflector device for a motor vehicle wheel, comprising:
   an elongate support configured to be mounted on a motor vehicle;
   a deflecting wall mounted on the elongate support so as to be movable between a retracted position in which, in a mounted state, said deflecting wall is raised with respect to the elongate support, and a deployed position in which, in the mounted state, said deflecting wall is lowered with respect to the elongate support; and an actuator configured to move said deflecting wall between the retracted and deployed positions, wherein the deflecting wall is mounted rotatably on the elongate support about an axis of rotation oriented substantially parallel to a longitudinal axis of the elongate support and driven by the actuator.

2. The device as claimed in claim 1, wherein the deflecting wall has, in longitudinal section, a ramp shape.

3. The device as claimed in claim 2, wherein the ramp is curved.

4. The device as claimed in claim 3, wherein the radius of curvature of the curved ramp decreases progressively from a distal end arranged remote from the wheel toward a proximal end arranged in the vicinity of the wheel.

5. The device as claimed in claim 4, wherein the deflecting wall has, at the proximal end arranged in the vicinity of the wheel, in cross section, a "U" shape, the bottom of the "U" being remote from the axis of rotation.

6. The device as claimed in claim 5, wherein said device comprises a closure wall situated at the proximal end of the deflecting wall.

7. The device as claimed in claim 1, wherein the elongate support is produced as a frame of rectangular shape and configured to be fixed to the chassis of a motor vehicle.

8. The device as claimed in claim 1, wherein the actuator comprises a rotary output member in direct or indirect engagement with said axis of rotation.

9. The device as claimed in claim 1, wherein said axis of rotation bearing the deflecting wall is configured to carry out a rotation of 180° between the retracted and deployed positions.

10. A motor vehicle, comprising at least one aerodynamic deflector device that is arranged upstream of a vehicle wheel, the aerodynamic deflector device further comprises:

an elongate support configured to be mounted on the motor vehicle;

a deflecting wall mounted on the elongate support so as to be movable between a retracted position in which, in a mounted state, said deflecting wall is raised with respect to the elongate support, and a deployed position in which, in the mounted state, said deflecting wall is lowered with respect to the elongate support; and an actuator configured to move said deflecting wall between the retracted and deployed positions, wherein the deflecting wall is mounted rotatably on the elongate support about an axis of rotation oriented substantially parallel to a longitudinal axis of the elongate support and driven by the actuator.

11. The motor vehicle as claimed in claim 10, wherein the deflecting wall has, in longitudinal section, a ramp shape.

12. The motor vehicle as claimed in claim 11, wherein the ramp is curved.

13. The motor vehicle as claimed in claim 12, wherein the radius of curvature of the curved ramp decreases progressively from a distal end arranged remote from the wheel toward a proximal end arranged in the vicinity of the wheel.

14. The motor vehicle as claimed in claim 13, wherein the deflecting wall has, at the proximal end arranged in the vicinity of the wheel, in cross section, a "U" shape, the bottom of the "U" being remote from the axis of rotation.

15. The motor vehicle as claimed in claim 14, wherein said device comprises a closure wall situated at the proximal end of the deflecting wall.

16. The motor vehicle as claimed in claim 10, wherein the elongate support is produced as a frame of rectangular shape and configured to be fixed to the chassis of a motor vehicle.

17. The motor vehicle as claimed in claim 10, wherein the actuator comprises a rotary output member in direct or indirect engagement with said axis of rotation.

18. The motor vehicle as claimed in claim 10, wherein said axis of rotation bearing the deflecting wall is configured to carry out a rotation of 180° between the retracted and deployed positions.

* * * * *